No. 863,463. PATENTED AUG. 13, 1907.
E. B. STIMPSON.
SPLIT RIVET.
APPLICATION FILED OCT. 11, 1906.
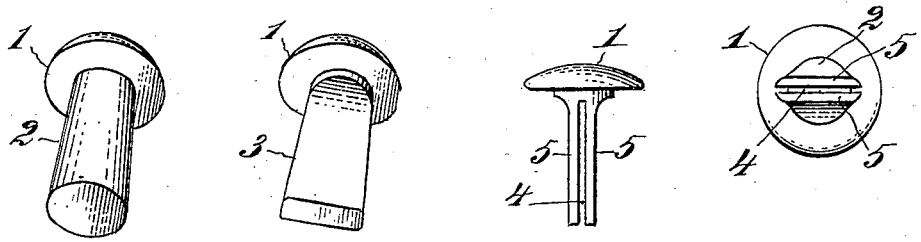
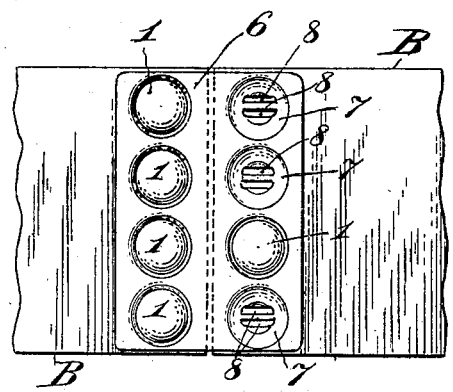
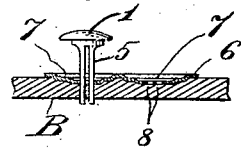
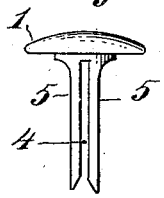
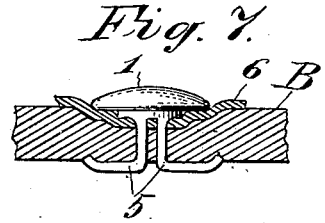
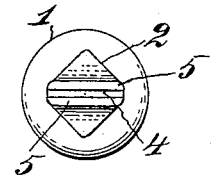
Witnesses
Edwin B. Stimpson
Inventor
By his Attorney

UNITED STATES PATENT OFFICE.

EDWIN BALL STIMPSON, OF NEW YORK, N. Y.

SPLIT RIVET.

No. 863,463.    Specification of Letters Patent.    Patented Aug. 13, 1907.

Application filed October 11, 1906. Serial No. 338,435.

*To all whom it may concern:*

Be it known that I, EDWIN BALL STIMPSON, a citizen of the United States, residing in the borough of Brooklyn, county of Kings, city and State of New York, have invented certain new and useful Improvements in Split Rivets, of which the following is a specification.

This invention relates to the general class of split rivets of which those used in securing the ends of driving belts are examples. According to the present invention the rivet is formed from the solid metal with the shank flattened and slitted edgewise so as to produce two broad prongs which are widest at their tips or free ends, as will be hereinafter explained.

Another feature of the invention resides in the plate through which the rivet passes in connecting the ends of a belt, for example.

In the accompanying drawings, which serve to illustrate an embodiment of the invention—Figure 1 is a perspective view of the rivet-blank. Fig. 2 is a similar view of the blank after it has been flattened. Fig. 3 is an edge view showing the rivet after the flattened shank has been slitted. Fig. 4 is an end view. Fig. 5 shows a part of a belt with the plate and rivets. Fig. 6 is a sectional view of a fragment of the plate and fabric with a rivet partly inserted. Fig. 7 is an enlarged sectional view of the plate and fabric, showing the prongs of the rivet clenched. Fig. 8 is a view showing a rivet with the prongs beveled at their tips. Fig. 9 is an end vew similar to Fig. 4, showing the prongs formed from a shank of quadrangular form in cross-section.

Fig. 1 shows the blank for the rivet, having a head 1 and solid shank 2, the latter being circular in cross-section and tapered from the tip toward the head. This blank may be produced by forging or pressing according to known processes.

Fig. 2 shows the blank after the next step, which consists in reducing the metal of the shank on opposite sides or faces so as to produce a flat blade or stem 3. This reduction can be conveniently effected by milling or cutting away the surplus metal.

Figs. 3 and 4 show the rivet after the next step, which consists in cutting a slot 4 in said stem widthwise, thus producing two flat clenching prongs 5, 5, which are as wide as the shank 2 (Fig. 1) and which are widest at their tips or free ends.

Figs. 5, 6 and 7 show the plate 6 which may be used in connection with the rivets in securing together the ends of a belt B, for example. This plate will have a recess 7 for the head of the rivet and two slot-like apertures 8 to receive the rivet-prongs, as clearly shown.

As the clenched prongs (see Fig. 7) are subject to abrasion and excessive wear, in the use of a belt for example, and often wear away to an extent sufficient to cause the plate to break away from the belt, it is desirable that these prongs shall have considerable wearing surface and mass in order that they may resist abrasion. The broad and tapered prong provides this and also provides a broad surface to bear on the material at the clench. The apertured plate also provides that the clenched prongs shall all lie in one direction, as transversely of the width of a belt.

Fig. 8 shows how the tips of the prongs 5 may be beveled at the inside. This beveling provides an edge to penetrate the material B, and also, when the bevels are at the inside, it tends to spread the prongs when they are driven. But the particular shape of the tips of the prongs is not important to this invention.

Fig. 9 shows how the shank 2 may be quadrangular, or of some other form than round in cross-section.

It will be noted that the rivet is not made from sheet-metal nor made up of parts, it is forged and milled out of the solid metal and is all in one piece or integral.

Having thus described my invention, I claim—

A split rivet formed from solid metal, having a head and a shank which tapers toward the head, said shank being flattened by reduction at its opposite sides and slitted widthwise to form two clenching prongs disposed face to face.

In witness whereof I have hereunto signed my name this 9th day of October, 1906, in the presence of two subscribing witnesses.

EDWIN BALL STIMPSON.

Witnesses:
HENRY CONNETT,
H. G. HOSE.